April 18, 1933.  F. T. NESBITT  1,904,983
LEER
Filed Jan. 9, 1928   9 Sheets-Sheet 3
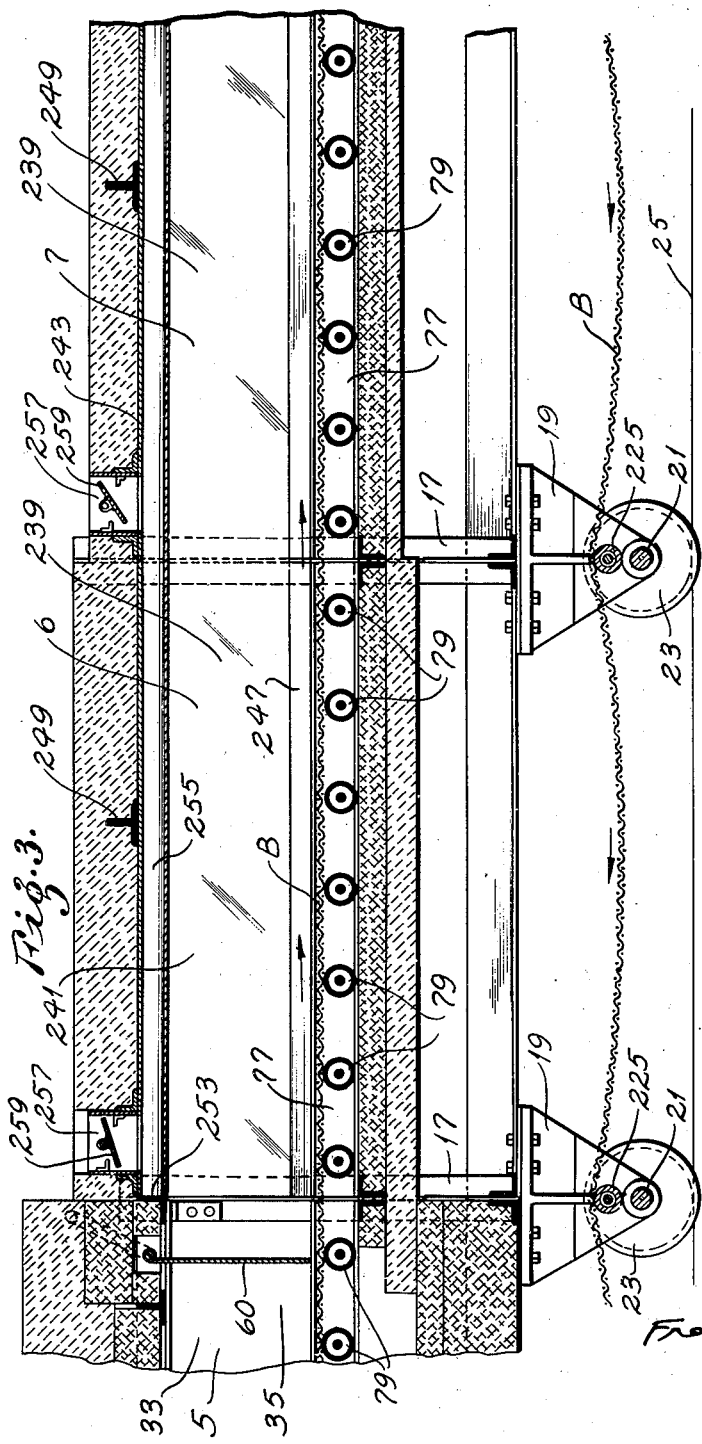
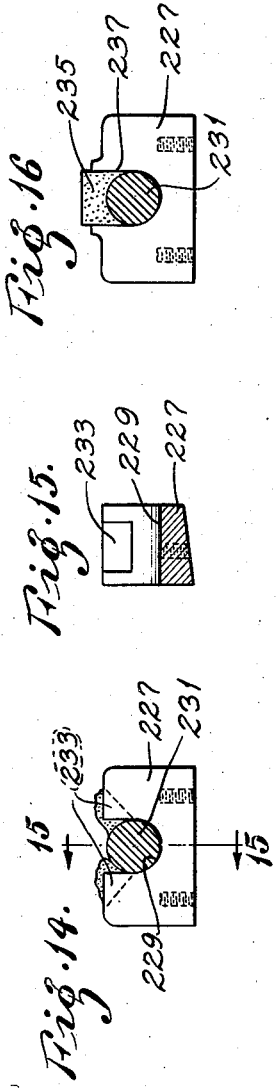
Frank T. Nesbitt,
Inventor,
Delos G. Haynes,
Attorney

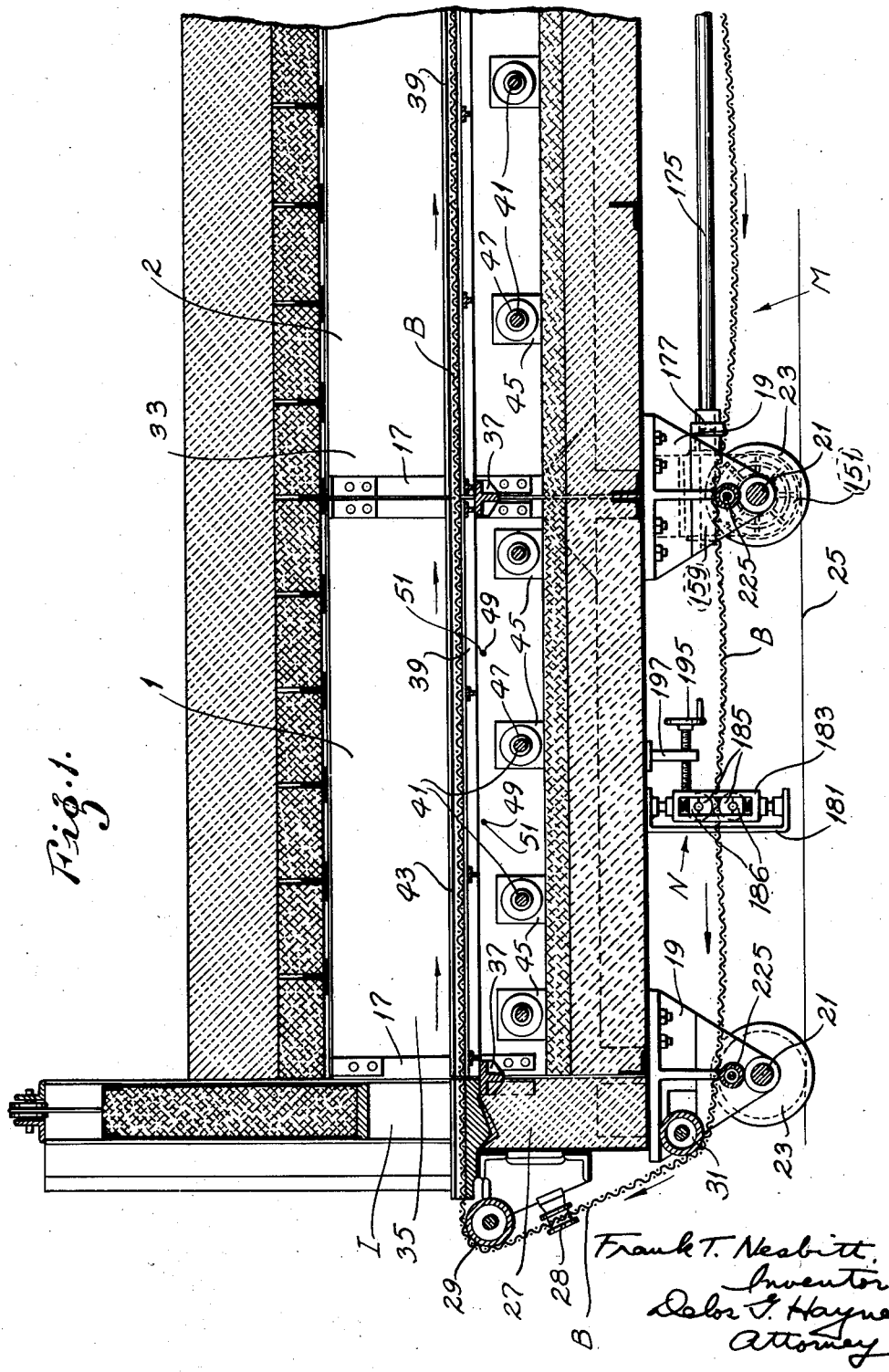

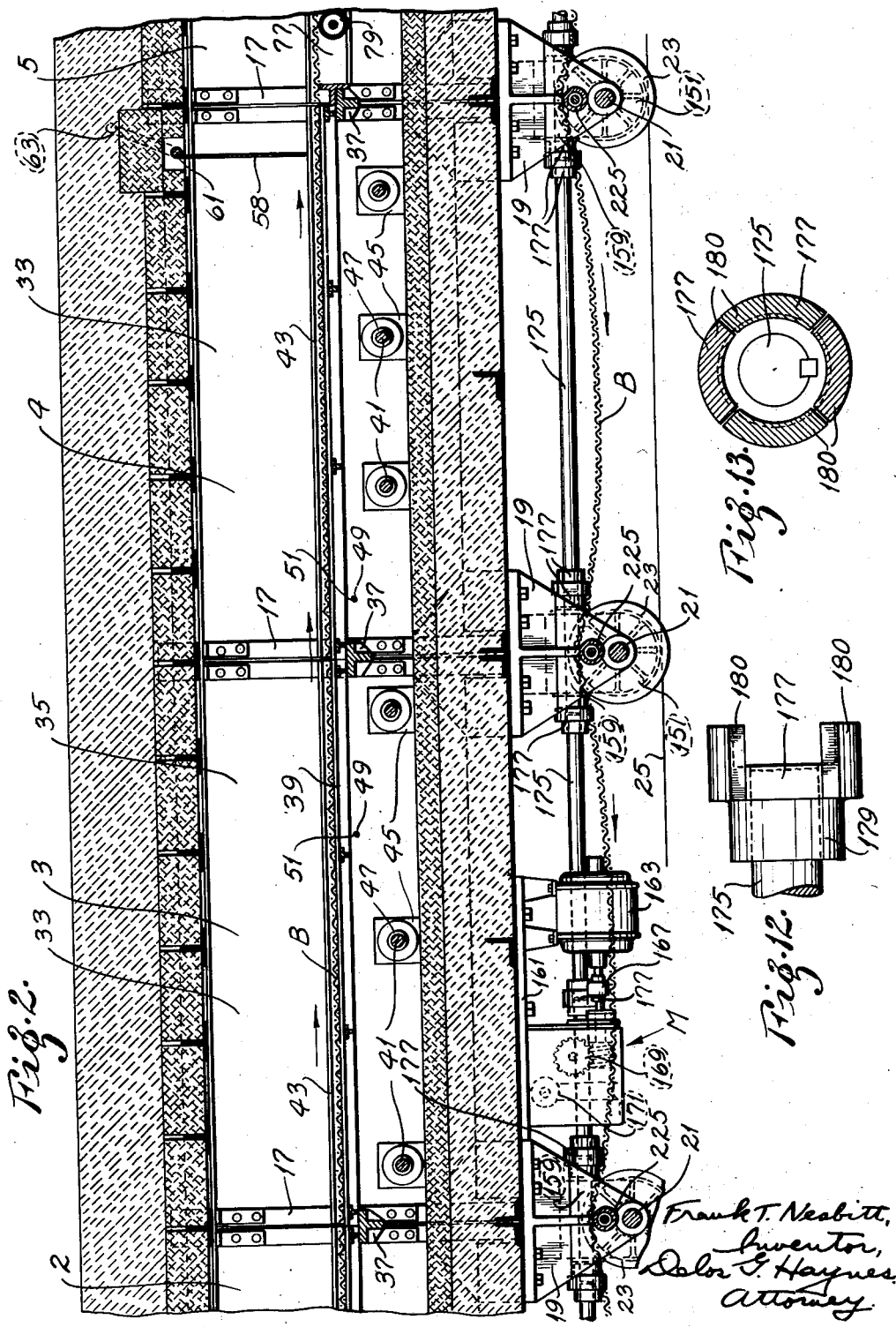

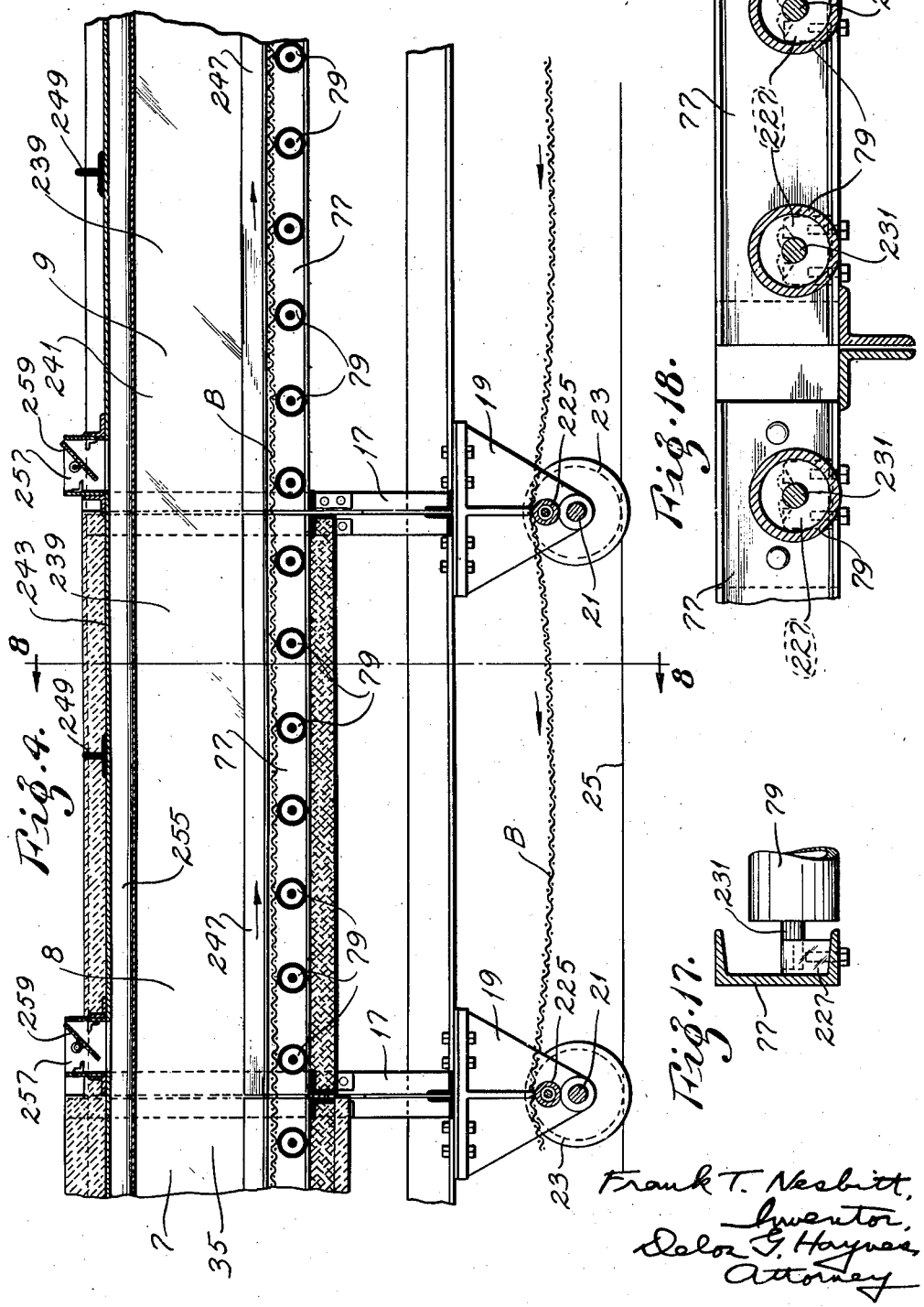

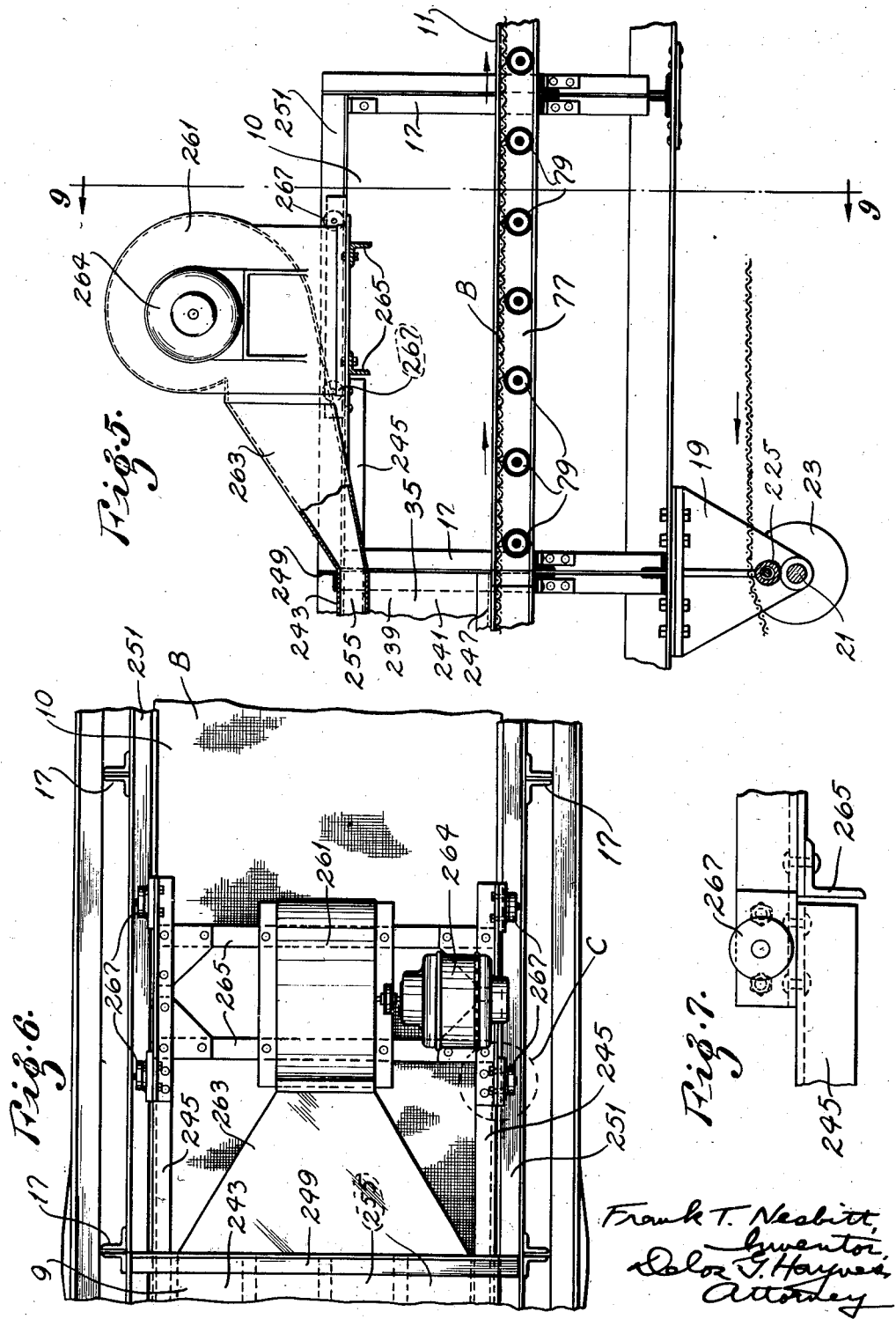

April 18, 1933.  F. T. NESBITT  1,904,983
LEER
Filed Jan. 9, 1928  9 Sheets-Sheet 6

April 18, 1933.  F. T. NESBITT  1,904,983
LEER
Filed Jan. 9, 1928   9 Sheets-Sheet 7

Frank T. Nesbitt,
Inventor,
Attorney

April 18, 1933.  F. T. NESBITT  1,904,983
LEER
Filed Jan. 9, 1928  9 Sheets-Sheet 8

Frank T. Nesbitt, Inventor
Delos G. Haynes, Attorney

April 18, 1933. F. T. NESBITT 1,904,983
LEER
Filed Jan. 9, 1928 9 Sheets-Sheet 9
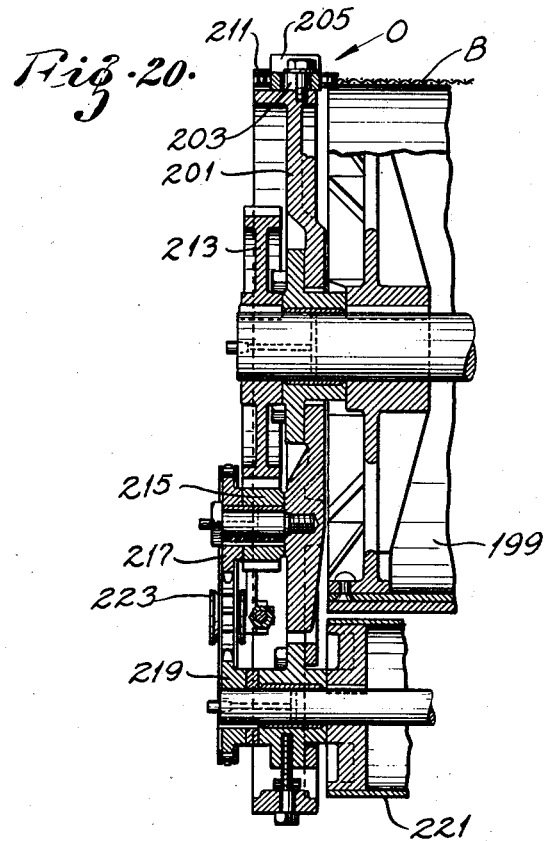
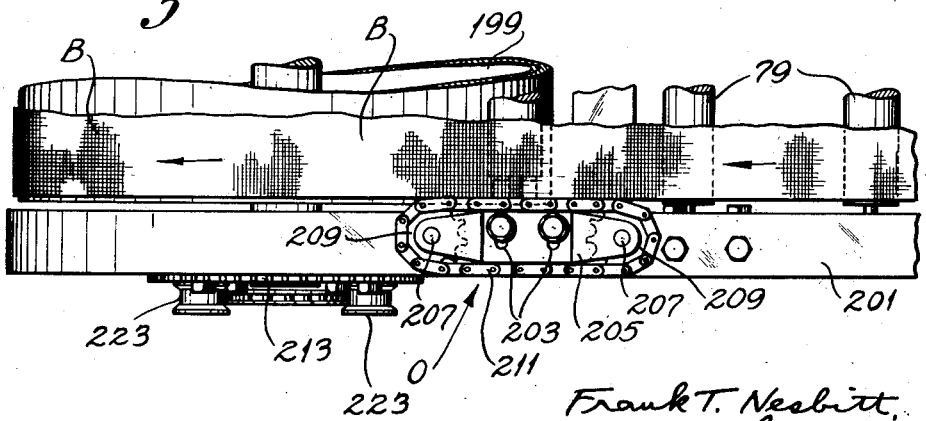
Frank T. Nesbitt,
Inventor
Delos G. Haynes
Attorney Patented Apr. 18, 1933

1,904,983

UNITED STATES PATENT OFFICE

FRANK T. NESBITT, OF ALTON, ILLINOIS, ASSIGNOR, BY MESNE ASSIGNMENTS, TO OWENS-ILLINOIS GLASS COMPANY, OF TOLEDO, OHIO, A CORPORATION OF OHIO

LEER

Application filed January 9, 1928. Serial No. 245,331.

This invention relates to leers and with regard to certain more specific features, to glass annealing leers of the electrically heated type.

Among the several objects of the invention may be noted the provision of a glass annealing leer provided with improved means for decreasing conveyor friction to a minimum, whereby a lighter, longer lived conveyor belt may be employed, having less thermal capacity and therefore lower heat losses in making its circuit into and out of the leer, and whereby lower belt tension is required with consequent increased ease with which the belt may be guided; the provision of improved belt guiding means in view of the above; the provision of improved leer temperature controlling means; and the provision of a lighter leer of the class described which is self contained and self motivated for movement along rails or the like. Other objects will be in part obvious and in part pointed out hereinafter.

The invention accordingly comprises the elements and combinations of elements, features of construction, and arrangements of parts which will be exemplified in the structure hereinafter described, and the scope of the application of which will be indicated in the following claims.

In the accompanying drawings, in which are shown several of various possible embodiments of the invention, Fig. 1 is a fragmentary longitudinal section showing two front sections of the leer;

Fig. 2 is a view similar to Fig. 1 showing the third to fifth sections;

Fig. 3 is a view similar to Fig. 1 showing portions of the fifth to seventh sections;

Fig. 4 is a view similar to Fig. 1 showing portions of the seventh to ninth sections;

Fig. 5 is a view similar to Fig. 1, showing the tenth blower supporting section;

Fig. 6 is a plan view of Fig. 5;

Fig. 7 is a fragmentary side elevation showing a certain roller mounting;

Fig. 12 is an enlarged side elevation showing a coupling member;

Fig. 13 is a cross section taken through a coupling connection;

Fig. 14 is an enlarged end elevation of an improved bearing block;

Fig. 15 is a section taken on line 15—15 of Fig. 14;

Fig. 16 is a view similar to Fig. 14 but shows a modified form of bearing block;

Figs. 17 and 18 are sections showing the applications of bearing blocks;

Fig. 20 is a fragmentary cross section taken on line 20—20 of Fig. 19;

Fig. 21 is a fragmentary plan view of Fig. 20;

Similar reference characters indicate corresponding parts throughout the several views of the drawings.

Figure 9:
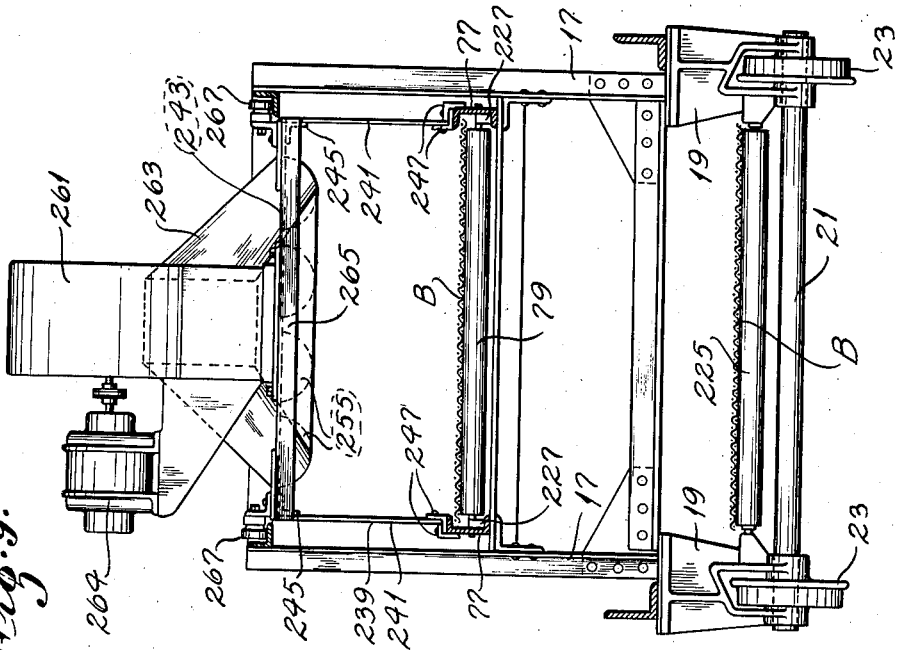
Fig. 9 is a cross section taken on line 9—9 of Fig. 5.

Referring now more particularly to Figs. 1 and 2 there are illustrated at numerals 1, 2, 3 and 4 the first four sections of the leer which constitute the heated annealing region thereof.

Each of the sections 1 to 4 comprise a suitable skeleton framework 17 of steel or other suitable materials mounted rigidly upon bolsters 19 at their points of juncture. The bolsters 19 are formed on suitable axles 21, carrying wheels 23 adapted to ride upon a track 25.

The track 25 is in such a position that the leer as a whole, may be juxtaposed so that the inlet passage I thereof may be placed near the point at which freshly blown bottles are received.

It is to be understood that the construction of all of the sections hereinafter to be described and consecutively numbered include a skeleton framework such as 17 mounted on a bolster 19, an axle 21 and wheels 23, which fact is apparent from an examination of the drawings. However, the bolsters between sections 1, 2, 3, 4 and 5 are of a different form than the remaining bolsters and will be described more in particular hereinafter.

Referring particularly to Figs. 1 and 2, it may be seen that the foremost bolster 19 supports the forward end of the first section 1, the inlet passage I, an inlet platform 27, the latter including an inlet supporting roll 29 and an idler guide roll 31, said rolls being for the purpose of guiding a flexible and reticulated conveyor belt B through the bottom of the inlet passage I. Side rolls 28 aid in maintaining the belt B in proper position. The conveyor belt is of open chain construction forming an open net work which is drawn through the sections of the leer in a manner to be described.

Each of the sections 1 to 4 are enclosed by suitable built up walls 33 composed of fire-resistant material, said walls being built up within and on the skeleton frameworks 17.

By means of the above construction, an open tunnel 35 is left extending longitudinally through each section; and the fact that these sections abut one another, results in the tunnel 35 being continuous throughout the sections.

As illustrated, the tunnel 35 reaches some distance below a set of supporting irons 37, thereby providing means for the insertion of certain electrical heating elements 41 below the level of said irons 37. The irons 37 support longitudinally arranged open belt supporting structure 39.

The purpose of the open structure 39 is to slidably support the flexible reticulated conveyor belt immediately above the heating elements 41 as said conveyor belt is drawn through the tunnel 35. Rails 43 are provided along the sides of the tunnel 35, above the irons 37, for the purpose of guiding and aligning the conveyor belt and also for the purpose of providing a guide rail for the bottles or ware mounted on said belt.

It may be noted from Figs. 1 and 2 that the heating elements are supported in suitable terminal blocks 45 and that openings 47 through the walls 33 are provided for the wiring to said grid elements.

Suitable openings 49 are also provided for the purpose of receiving thermostatically controlling thermocouples 51. Each thermocouple is placed as close as possible to the heated ware and consequently its controlling action is more directly in accord with the heating requirements for correct annealing.

It is to be understood that the required relays, switches and transformers, as well as a switchboard controls (not shown) are all mounted on and with the leer structure and are movable with said structure, whereby a completely mobile device is had. It is also to be understood that the circuits associated with the leer may be disconnected from the power input circuit whenever it is desired to move the leer, by using a conventional plug.

It is clear from the above that the temperature in separate but adjacent sections of the front portion of a leer may be independently controlled to give any desirable temperature gradient from section 1 to 4, the value of said gradient depending upon how each respective thermocouple and relay is set. The gradient is a descending one from front to rear and is quantitatively such that proper annealing is had in the heated annealing region comprising sections 1, 2, 3 and 4.

In order to maintain steady conditions within the heated annealing sections, an asbestos cloth curtain 58 is provided in the tunnel 35 at the rear end of the heated annealing section. This curtain 58 may be raised or lowered on the rotatable roller 61 for the purpose of accommodating the curtain 58 to the particular height of ware passing through the tunnel. The curtain is manually adjustable from a removable crank 63.

Figure 10:
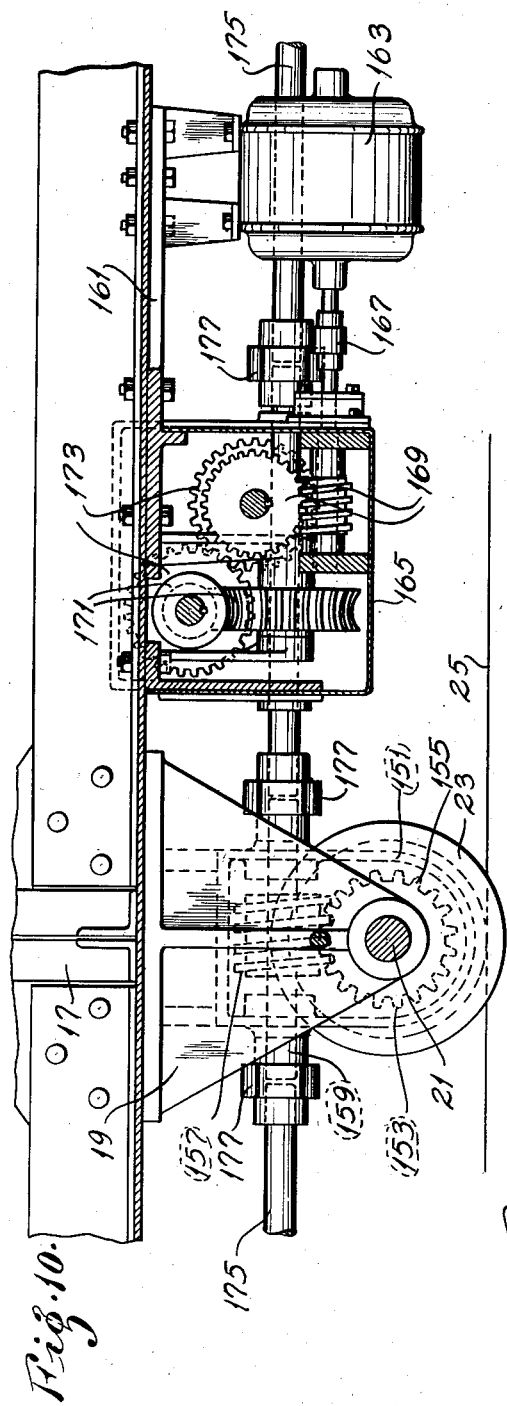
Fig. 10 is an enlarged fragmentary side elevation of a motor drive and transmission, parts being broken away.
Figure 11:
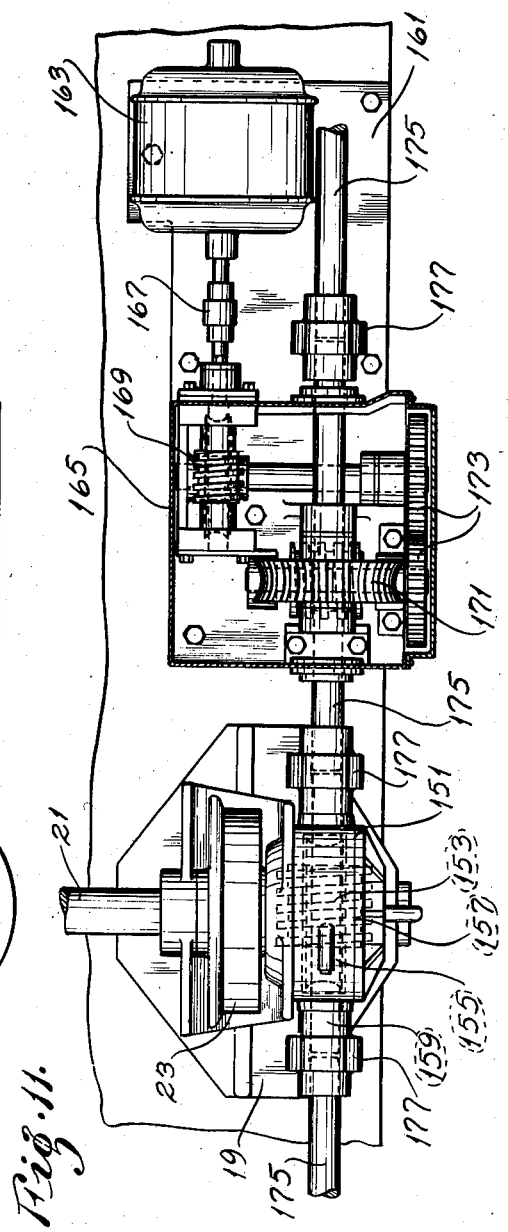
Fig. 11 is a bottom plan view of Fig. 10, parts being broken away.

The leer as a whole may be moved on its track by means of the power driving mechanism M associated with the sections 1 to 4, now under consideration. This driving mechanism M comprises (see Figs. 1, 2, 10 and 11) the second, third, fourth and fifth of the bolsters 19 on one side of the leer (Figs. 1 and 2) which are similar in most respects to the remainder of the bolsters (Figs. 8 and 9), except that they are provided with auxiliary housings 151, for carrying worm and wheel drives 153 (Figs. 10 and 11). The wheel 155 of each drive 153 is made fast to its respective axle 21; also, the wheels 23 of these particular driving axles 21 are fastened. Hence there are eight driving wheels under the heaviest part of the leer, which fact provides the proper amount of traction.

Each drive 153 includes a worm 157 mounted on a short length of shaft 159 mounted within its said housing 151.

Between the third and fourth bolster there is suspended from the bottom of the tunnel a bracket 161 carrying a reversible motor 163 and a gear reduction box 165, said motor 163 being coupled with the driving elements of said box by shafting 167, including a suitable coupling.

The box includes a first worm and wheel reducer 169 geared with a second worm and wheel reducer 171 by way of a set of spur gears 173. The worm of the second reducer 171 is made fast to a string of transmission shafting 175 which is in turn coupled with each length of said short shafting 159 by way of loose crown couplings 177.

Figs. 12 and 13 illustrate the type of loose coupling used, comprising meshed crowns 179 each having two loosely engaging teeth 180.

From the above it will be seen that by applying energy to the motor 163 to operate it in one direction or another, that the leer will be driven on the track 25 by way of the described transmission. Hence this comprises a self contained drive on a leer. The connections between the motor and wheels comprise a transmission.

The purpose of the loose couplings 177 is to provide means whereby the motor is not required to assume the driving load as it starts, but is permitted to exert its initial action in taking up slack. By this means a small motor of relatively low starting torque may be used. This is one of the distinct advantages of this invention, because it eliminates the prohibitive overhead cost of a motor with high starting torque. It should be remembered that a leer is not moved about continuously and that therefore the motor is idle over substantially long periods. This type of self contained drive is made commercially possible by this invention, because it permits the use of a small motor of low starting torque having only a small overhead charge over idle periods.

Figures 22, 23:
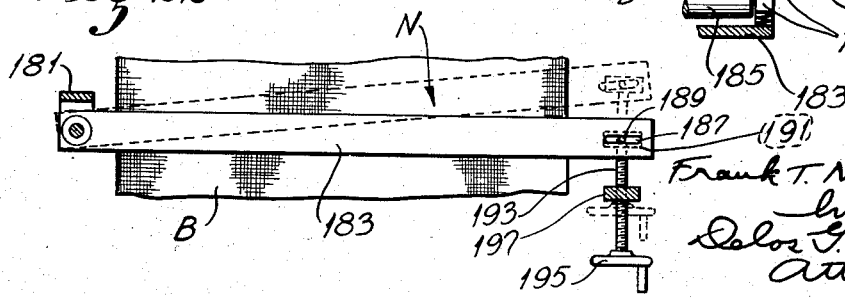
Fig. 22 is an enlarged plan view of a certain guiding mechanism shown in Fig. 1; and, Fig. 23 is a fragmentary detail showing certain elements of said guiding mechanism.

Another new feature with regard to the sections shown in Figs. 1 and 2 is the adjustable belt guiding means N shown in Figs. 1, 22 and 23. This means comprises a bracket 181 depending from one side of the tunnel and positioned to one side of the belt B. This bracket 181 pivotally supports a frame 183 surrounding the belt B and provided with two rollers 185, borne in the frame 183 by half bearing blocks 186, the latter being normally spring pressed toward one another, so as to press the rollers 185 against opposite sides of the belt B.

The unpivoted end of the frame 183 is slotted at 187 to receive gudgeons 189 of a nut 191 through which is threaded a screw 193 provided with a hand wheel 195. The screw 193 is screwed through a depending bracket 197, whereby it may be screwed backward and forward (see dotted lines, Fig. 22).

By manipulating the hand wheel 195 it is possible to set the bias rollers 185 to any desired degree with respect to the belt B. The effect of this is that the direction of the belt B in leaving the rolls 185 may be controlled by shifting the angle of said rolls. Unlike the ordinary methods of guiding belts, this accomplishes the desired end without pushing on the edge of the belt and consequently with better effect and less wear on the belt. The reason for placing the guiding means N near the mouth of the leer is to straighten out the belt directly as it enters the leer to receive the ware thereon.

The rolls 185 may have metallic or other friction surfaces such as wood or fiber.

Figure 19:
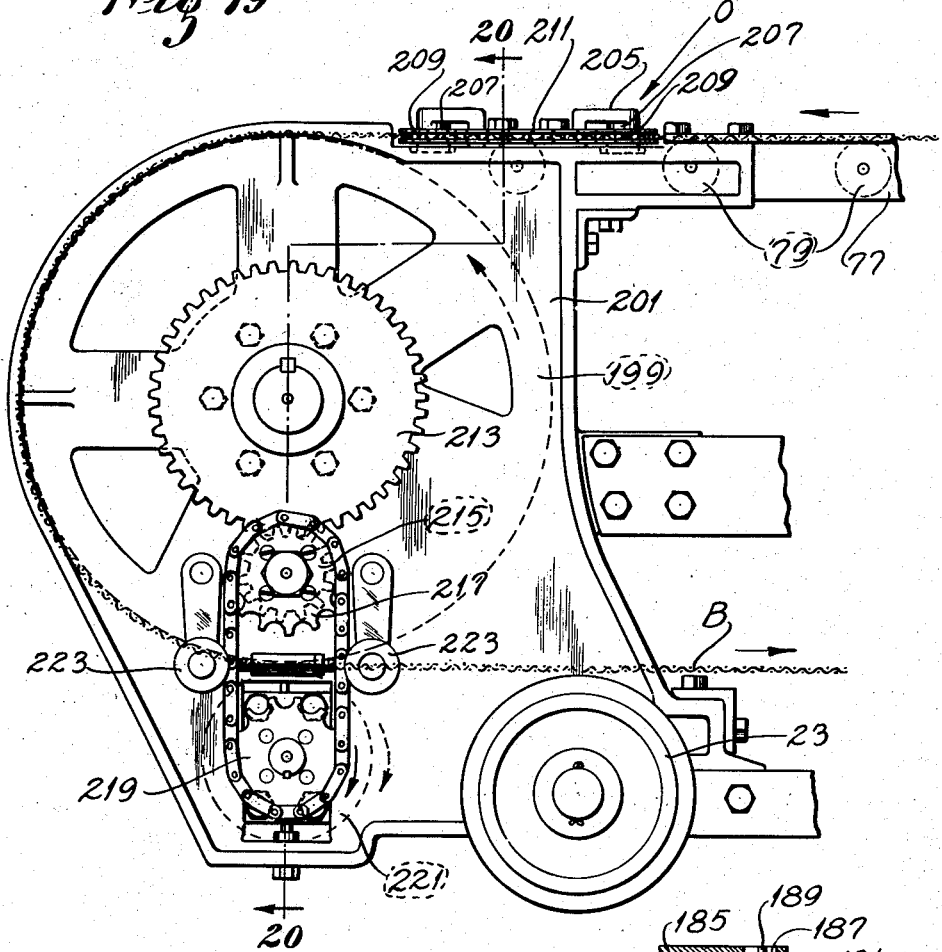
Fig. 19 is a right-side elevation showing the rear end of the leer.

Operating in conjunction with the guiding mechanism N at the front of the leer is a second adjustable guiding mechanism O at the rear end of the leer (see Figs. 19 to 21). This guiding mechanism O operates in conjunction with the rearward driving drum 199, the driving source of which is not shown because it forms no part of this invention.

The drum 199 draws the belt B rearwardly from out of the tunnel and returns the belt beneath the tunnel. This drum 199 is rotatably mounted in a rearward frame portion 201.

On the frame portion 201, directly on each side of the belt B, as it approaches the drum 199, is bolted by means of elongated adjusting slots 203, a bracket 205 carrying gudgeons 207 which support horizontally positioned sprockets 209. A short length of preferably roller chain 211 (flexible connector) is placed over the sprockets and each sideward unit as a whole is adjusted, before being permanently fastened, so that its idling chain 211 runs tangentially to the side of the belt B in such a manner that the belt is properly guided to feed over the driving roll 199. The movement of the belt effects the movement of each chain 211.

The roll 199 drives a gear 213 which meshes with a smaller pinion 215, the latter driving a sprocket 217. The sprocket 217 is chained with an equal sized sprocket 219 driving a take-up roll 221. It is evident from the vectors used in Fig. 19 that the resulting movement of the roll 221 is clockwise, while that of the roll 199 is counter-clockwise. Also, the surface speed of the roll 221 is greater than that of the roll 199 with the result that the surface of roll 221 slips on the belt B and tends to pull it tight over the surface of the driving roll 199. Adjustable idlers 223 are used to adjust the chain between the sprockets 217, 219.

The belt returns forwardly from the roll 199 outside and beneath the tunnel and is supported on suitable idling rollers 225 located on and between pairs of the bolsters 19. The cooperating means for maintaining the chain alignment, as set out herein is most effective, because of the particular guiding methods employed and the placement of the same.

Figure 8:
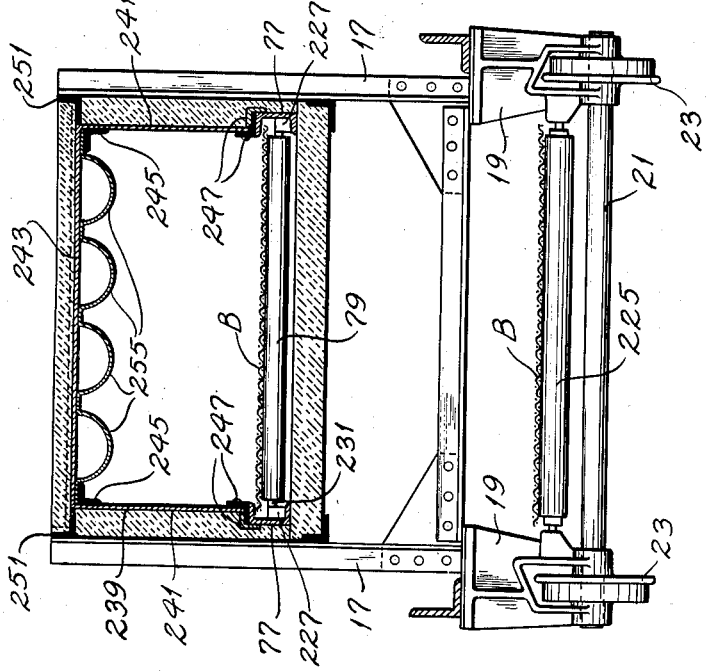
Fig. 8 is a cross section taken along line 8—8 of Fig. 4.

The next portion of the leer to be considered is the unheated annealing region comprising sections 5 to 9, shown more particularly in Figs. 3, 4 and 8. These sections 5 to 9 are built up in a manner analogous to the sections 1 to 4, except that they are not normally supplied with heating elements or thermocouples. These sections 5 to 9 are coupled together in the manner hereinbefore described for the sections 1 to 4 and they are also coupled to said sections 1 to 4 at the dividing curtain 58. They are not provided with a driving mechanism, because their movement is controlled from the movement imparted by the driving mechanism M. The insulation around sections 5 to 9 decreases by sections toward the rear of the apparatus.

Section 10 (Figs. 5, 6 and 9) has no heat retaining side walls but comprises mainly the framework 17 for supporting certain elements to be described.

The remaining sections of the leer (any desirable number) are open and are so constructed as to function as supports for the belt B (see section 11, Fig. 5 and also the last section shown in Fig. 19).

The sections 5 to 10 and the remaining sections of the leer are not provided with said structure 39 for supporting the belt but are provided with side rails 77 between which are provided anti-friction supporting rollers 79 for supporting the conveyor belt B.

Heretofore trouble has been experienced with rollers of this class, because of the high frictional effect at their bearings which required an excessive driving tension on the belt B, thereby requiring a strong and heavy belt (having necessarily a high thermal capacity) and which robbed the tunnel of much heat in passing therefrom. If the bearings are placed outside the tunnel, then heat is lost through them directly by conduction.

Figs. 14 to 18 illustrate the improved type of internal bearing used herein in which there is employed a pillow block 227 supported within the flanges and webs of the side rails 77 and provided with a semi-circular incomplete bearing surface 229 for receiving the gudgeon 231 of a roll 79. The gudgeon and block are both metallic. Any expansion of the block due to heat will not bind the gudgeon, because the bearing is only semi-circular or substantially so.

Above and on each side of the semi-circular portion 229 of each block 227 is formed a recess 233 which upon assembly is filled with flake graphite or other dry lubricant which is substantially unaffected by heat. Then, as the gudgeon 229 rotates in the block, graphite is drawn down into the bearing from one recess 233 and pushed out into the other recess, where it is held ready to be picked up by the gudgeon at a subsequent revolution. This provides an exceedingly frictionless bearing capable of withstanding high temperatures without attention more than once or twice a year.

In Fig. 16 is shown a form of this bearing in which the recesses 233 are eliminated and in which a graphite or carbon brush 235 is straddled over the gudgeon and guided by the vertical tangential sides 237 of the block. The brush 235 is solid and has its lower end rounded concavely to the shape of the gudgeon before application. The action of the gudgeon in rotating is to wear down the brush 235, the graphite which is thus worn off functioning as a lubricant.

In accordance with the objects of the invention, improved means is used for cooling the sections 5 to 9. They have a descending temperature gradient, due to the variation in insulation thickness, but it will be noted that the gradient due to variable insulation thickness is of a fixed nature. In order to obtain a controllable gradient the following construction is employed (Figs. 3 to 9):

Through sections 6, 7, 8 and 9 is formed an internal, preferably sheet metal jacket 239 comprising side walls 241 and roof or longitudinal member 243 suitably joined by angle irons 245. A pair of angle irons 247 is used at the bottom of each side wall 241 for slidably cooperating with said rails 77. The whole jacket 239 depends from cross supports 249 which extend sidewardly from the upper surface of the jacket and rest loosely upon angle iron rails 251.

The forward end of the jacket 239 is permanently fastened or anchored at the juncture between sections 5 and 6 by means of a cross brace 253. It will be seen that the brace 253 being permanently fastened and the cross supports 249 resting merely on the rails 251, results in the jacket 239 being independently expansible with respect to the tunnel itself. It should be noted in this connection that the angle irons 247 are one with the jacket 239 but are not fastened to the rails 77. They merely slide with the jacket on the rails 77 when differential expansions take place. The insulating material shown packed around the jacket to form a tunnel in Figs. 4 and 8 does not interfere with the relative movements between said jacket and the remainder of the leer because said material is not attached to the jacket. It is usually in powder form.

The purpose of the jacket 239 is to support beneath the roof 243 thereof a plurality of air circulating ducts 255 which are provided at intervals with flues 257. The flues 257 include dampers 259 whereby the egress of air from the ducts 255 may be controlled. The control is manual.

In order to circulate air through the duct 255, they are connected with a blower unit 261 by means of a connection 263. The blower unit includes a motor 264 mounted as an integral part.

The blower unit 261 is supported on a movable platform 265, the latter in turn being supported by wheels 267 which ride on said side rails 251. The result is that the relative heavy blower unit is readily movable and under the effect of the independent expansion and contraction of the jacket connected thereto may take up any one of various positions with respect to the main body of the leer. Rollers are not required at the ends of cross supports 249 because the main body of the jacket 239 is relatively light and therefore does not introduce much friction at the sliding ends of said supports 249.

Air at atmospheric temperature is continually pumped into the cooling ducts 255 by the blower unit 261. The temperature gradient may be controlled by opening or closing predetermined numbers of the flues 257. For instance, in Fig. 4, if the left hand flue 257 were closed, no air would circulate through the ducts 255 above section 8 and that section would consequently be warmer than if said flue 257 were open as shown.

It is evident that the jacket 239 with its ducts 255 having cool air flowing therethrough will necessarily expand or contract at a different rate than the main portions of the leer itself. Hence the independent expansion means provided herein is exceedingly advantageous. Ordinarily the light sheet metal jacket would buckle so as to render the leer useless.

Fig. 7 illustrates in detail the side elevation of the roller shown within the dotted circle C of Fig. 6 and wherein is also shown an extension of the irons 245 forming a strong connection between the blower carriage and the jacket.

The operation of the leer, insofar as it affects this invention is as follows:

Positioning of the leer as a whole is accomplished by turning on the motor 163, which is permitted to start because of the described loose couplings and which then effectively assumes the load of driving. If no slack is present for a given direction of movement the motor may be reversed for an instant in order to introduce slack for starting in the required direction.

It should be noted that the speed reducing means has portions thereof such as the worm and wheel reducers 169, 171 located between the lost motion couplings 177 and the motor, whereby said motor is given an appreciable start before it assumes its load.

After the leer is properly positioned, the heating elements are turned on and the belt B is given the movement indicated by the arrows. This movement is accomplished by rotating the drum 199 in the direction shown in Fig. 19. The belt moves forwardly over the rollers 225 outside and below the tunnel and rearwardly through the tunnel. Because of the great reduction in friction at the bearings of rollers 79, the belt is not required to be so heavily constructed and, having less thermal capacity, consequently carries less heat from the tunnel than is usual in belts of this class. The resulting saving in operating costs is great. Also the wear on the belt is less.

The guides N and O effect proper positioning of the belt and prevent side wear and drag. Hence they also tend to permit the use of a lighter belt having inherently lower heat losses.

The curtain 58 separates the heated sections 1 to 4 from the remainder of the leer. A second curtain 60, similar to curtain 58 also separates section 5 from the remainder of the leer. This section has no cooling circulating ducts.

The remaining closed in sections have the cooling ducts 255, as described, which permit of a control of the heat extracted from these sections. Control of the amount of air flowing to and through the ducts 255 of any section 6, 7, 8 or 9 is had by manipulating the dampers 259.

It is to be understood that in the case of section 9 no insulation is used around the jacket, but nevertheless the belt B is provided with a passage through the framework and has the jacket over it. In other words, sections 6, 7 and 8 are provided with both a tunnel and internal jacket, while section 9 has only a jacket. However sections 6, 7, 8 and 9 all have a passage therethrough for the belt.

By a continuous member or jacket is meant herein one which has no intermediate thermal expansion joints therein, although it may be built up of more than one piece.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

In a leer for annealing glassware, a support, a tunnel carried by said support, a leer conveyor arranged in the lower portion of the tunnel, supporting means for the conveyor, said tunnel including abutting heating and cooling sections, said cooling section comprising a continuous sheet metal jacket inverted U-shape in cross section forming a roof and pair of opposed longitudinal side walls, means for anchoring the inner end of said jacket to the support, a pair of side rails spaced apart transversely of the leer and extending longitudinally thereof in proximity to the margins of the roof, jacket supporting means fixed to the jacket and slidingly contacting the upper surface of the side rails providing for expansion and contraction of the jacket independently of the conveyor support and remaining leer structure near the anchoring point, cooling flues extending lengthwise of the upper portion of the jacket, and means for directing a temperature regulating medium through said flues.

In testimony whereof, I have signed my name to this specification this 6th day of January, 1928.

FRANK T. NESBITT.